(12) United States Patent
Gatherer

(10) Patent No.: US 6,560,294 B1
(45) Date of Patent: May 6, 2003

(54) PHASE ESTIMATION IN CARRIER RECOVERY OF PHASE-MODULATED SIGNALS SUCH AS QAM SIGNALS

(75) Inventor: Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/393,366

(22) Filed: Sep. 10, 1999

Related U.S. Application Data

(60) Provisional application No. 60/101,830, filed on Sep. 25, 1998.

(51) Int. Cl.$^7$ ................................................ H04L 5/12
(52) U.S. Cl. ........................ 375/261; 348/725; 375/326
(58) Field of Search ................................ 375/261, 232, 375/233, 270, 234; 348/725; 332/103

(56) References Cited

U.S. PATENT DOCUMENTS

| | | | |
|---|---|---|---|
| 4,587,498 A | 5/1986 | Bonnerot et al. ............ | 329/122 |
| 5,519,733 A | 5/1996 | Huang ........................ | 375/326 |
| 5,970,093 A | * 10/1999 | de Lantremange .......... | 375/232 |

OTHER PUBLICATIONS

"Carrier–Tracking Loops for Polyphase Signals", ,*Telecommunication Systems Engineering,* Lindsey, et. al., Chapter 2, , Sec. 2–5, pp. 70–81.

"Carier Recovery For Syncrodyne Demodulation", *The Theory and Practice of Modem Design,* JohnA.C. Bingham, 6.3 Feedback Methods, 1988, pp. 173–174.

* cited by examiner

*Primary Examiner*—Stephen Chin
*Assistant Examiner*—Curtis Odom
(74) *Attorney, Agent, or Firm*—Pedro P. Hernandez; W. James Brady, III; Frederick J. Telecky, Jr.

(57) ABSTRACT

A cable modem (20) including a demodulator (25) having an improved carrier recovery circuit (35) is disclosed. The cable modem (20) demodulates phase-modulated signals, including phase and amplitude modulated signals such as quadrature amplitude modulation (QAM) information. The carrier recovery circuit (35) includes a phase detection function (40), preferably realized by way of programs executed by a digital signal processor, that generates a derivative signal (g(x")) based upon a summation of a complex function of a corrected input signal (x") over some or all of the possible points in the modulation constellation. In one embodiment of the invention, the derivative signal is an exact evaluation, considered over the sum of all points in the constellation; in another embodiment of the invention, only four small magnitude points, at relative quadrature phases, are included in the summation. Also disclosed is an embodiment of the invention in which a first order Taylor series operation is used upon QAM signals.

19 Claims, 4 Drawing Sheets

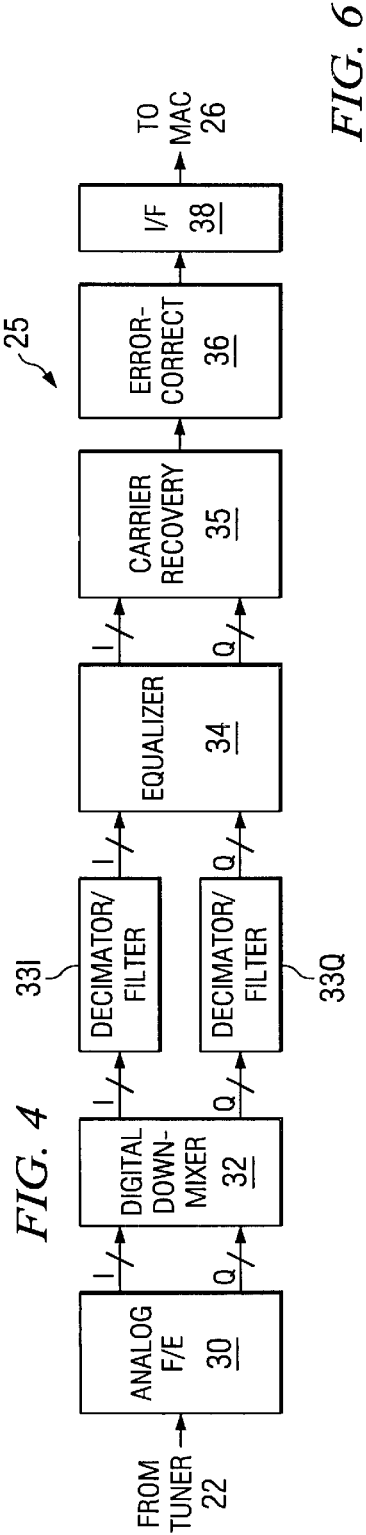

PHASE ESTIMATION IN CARRIER RECOVERY OF PHASE-MODULATED SIGNALS SUCH AS QAM SIGNALS

CROSS-REFERENCE TO RELATED APPLICATIONS

This application claims priority under 35 USC § 119(c)(1) of provisional application Ser. No. 60/101,830 filed Sep. 25, 1998.

STATEMENT REGARDING FEDERALLY SPONSORED RESEARCH OR DEVELOPMENT

Not applicable.

BACKGROUND OF THE INVENTION

This invention is in the field of data communications, and is more specifically directed to carrier recovery in phase-modulated signals used in such communication.

As is well known in the field, several modulation techniques are now commonly used for the communication of digital signals at high data rates. In general, these modulation techniques are used to encode the communicated digital information into an analog signal by grouping a specified number of bits into a "symbol", and by then modulating a carrier signal according to the digital value of each symbol in the communicated sequence.

One important way in which such modulation is implemented is phase modulation, in which the value of each communicated signal is at least partially encoded by the phase of the symbol relative to the preceding symbol in the serial stream. In phase-shift keying, for example, the relative inter-symbol phase shift fully specifies the symbol value, and as such no amplitude modulation is involved. A common type of phase-shift keying is quadrature-phase-shift-keying (QPSK), where the relative phase shift from symbol-to-symbol is in multiples of 90° (hence the quadrature nomenclature). QPSK modulation thus encodes two-bit digital symbol values.

Another type of modulation includes both phase and amplitude modulation, such that each symbol is encoded as the combination of an amplitude value (i.e, one value of a defined set of values) and a relative phase shift (also selected as one of a possible set of defined phase shifts). One type of modulation in this class is referred to as quadrature-amplitude-modulation (QAM). QAM modulation techniques are generally referred to by the number of members in their specified "constellation" of values. For example, 16-QAM refers to a modulation scheme in which the symbol amplitude may occupy one of sixteen possible points in complex space. In modern communication systems, 256-QAM has now become popular for encoding eight-bit digital symbol values (i.e., bytes) into 256 possible points in complex space.

In each of these types of modulation, of course, the modulated signals are communicated at a carrier frequency. The carrier frequency determines the rate at which the digital signal values (symbols) are communicated over the particular physical and logical communication facility, whether implemented by coaxial cable, fiber optics, or twisted-pair wires.

Carrier recovery refers to the processes performed at the receiving end of a modulated signal, by way of which the carrier frequency is eliminated from the incoming signal, and the remaining amplitude and phase information is then rendered available for decoding into the digital values for each symbol. In conventional high-performance digital communications receivers, for example cable modems and the like, this carrier recovery is performed in several stages. Typically a first demodulation operation, also referred to as down-mixing, is performed to reduce the incoming signal into, ideally, a spectrum centered about DC. Realistically, the demodulated signal at this point is a substantially low frequency signal that may be represented as follows:

$$S(t)e^{j[2\pi \Delta f_0 t + \theta]} + n$$

where S(t) corresponds to the exact constellation symbols (and thus is a complex quantity, as including phase information). Because such first stage demodulation is not exactly accurate, however, the demodulated signal generally retains a slight phase error that varies over time. In this representation, $\theta_0$ is a phase error for a given symbol, and $\Delta f_0$ is an error frequency at which this phase error varies over time. The n term refers to random noise present in the input signal. In terms of the complex constellation of possible symbol values, one may consider the first-stage demodulated signal as having a phase error corresponding to a rotation of angle $\theta_0$ of the constellation S(t) from its true position, where the rotation varies over time at error frequency $\Delta f_0$.

Carrier recovery thus also includes a process by way of which the phase errors are eliminated from the demodulated signal, leaving the true complex signal S(t) for decoding. This additional process is often referred to as derotation. A phase-locked loop (PLL) is a commonly used circuit for executing such carrier recovery. As is fundamental in the art, PLLs generally include a phase detection circuit that compares an input signal against the PLL output signal, and that generates an error signal corresponding to the phase difference therebetween; this error signal (typically with high frequency variations filtered out) is then used in modulating the output signal according to the error signal, so that the output signal eventually "locks" onto the input signal. The stable output signal, over time, has time-dependent phase error eliminated therefrom, and is thus suitable for decoding.

In modern high-data rate carrier recovery schemes, it has been observed that the phase detection process is of significant importance. One can increase the data rate of a modulated signal by encoding more bits per symbol, thus increasing the number of points in the modulation constellation. This, of course, also results in smaller phase separation between adjacent constellation points, which necessitates accurate phase detection in the carrier recovery processes. Additionally, the gain of the phase correction produced by the phase detector as a function of phase error is also important, not only in providing high-performance carrier recovery, but also in avoiding false lock situations.

One type of conventional phase estimator is referred to in the art as "power-type estimators". Attention in this regard is directed to Lindsey and Simon, *Telecommunication Systems Engineering* (General Publishing Company, 1973), pp. 71–80. In these systems, the input signal is raised to a significantly high enough power such that phase information is effectively removed, leaving only information concerning phase error. These power-type phase estimators are useful in pure phase-modulated signals (PSK), but are not particularly suited for modulation schemes, such as QAM, in which the possible phases of the data are not evenly distributed, and in which the phase error cannot therefore be readily retrieved.

Another type of conventional phase detection scheme will now be described relative to FIG. 1, in which an example of a conventional carrier recovery circuit is shown. In this example, carrier recovery circuit 2 receives a demodulated input signal of the form:

$$x' = xe^{j\theta} + n$$

where x corresponds to the actual signal, where n corresponds to random (Gaussian white) noise, and where $\theta$ is the residual phase error to be removed by carrier recovery circuit 2. This input signal is applied to one input of multiplier 4, which applies a phase correction factor $e^{-j\theta}$. Low-pass loop filter 8 may include some type of summing or integration, particularly in those cases where phase detector 6 generates a phase estimate $\hat{\theta}$ in the form of a derivative of a probability function.

According to this conventional phase estimation approach, phase detector 6 operates by effectively maximizing a probability function $p(\theta|x')$, and identifying the angle $\theta$ that renders this maximum may be considered to be the detected phase error of the input signal x'. After application of Bayes' Rule, and considering both that the phase angle is independent of the constellation point x and also that the probability distribution of phase error $\theta$ is uniform, one may consider the following probability function expression:

$$\log p(x' \mid x, \theta) = K - \frac{1}{\sigma_n^2} \|x' - xe^{j\theta}\|^2$$

where $\sigma_n^2$ is the noise power of the Gaussian noise, and where K is a constant. Expansion of the squared term changes the log of the probability function to:

$$\log p(x' \mid x, \theta) = K - \frac{\|x'\|^2}{\sigma_n^2} - \frac{\|x\|^2}{\sigma_n^2} + \frac{1}{\sigma_n^2} 2\mathrm{Re}\{x'^* xe^{j\theta}\}$$

The actual signal value x is, of course, not known a prior, and therefore this probability function is best evaluated as a summation over the entire constellation of x as follows:

$$\log p(x' \mid \theta) = \log \sum_{\text{all } x} p(x' \mid \theta, x) p(x)$$

An exact evaluation of this expression may be considered as:

$$p(x' \mid \theta) = \tilde{K} e^{-\frac{\|x'\|^2}{\sigma_n^2}} \sum_{\text{all } x} \left( e^{-\frac{\|x\|^2}{\sigma_n^2} + \frac{2\mathrm{Re}\{x'^* xe^{j\theta}\}}{\sigma_n^2}} p(x) \right)$$

For a uniform probabilty distribution of symbol values x over an N-point constellation, one may consider the sum as follows:

$$\sum_{\text{all } x} p(x) = \frac{1}{N}$$

which renders the desired probability function of x' given $\theta$ to the following:

$$p(x' \mid \theta) = \tilde{K} \sum_{\text{all } x} e^{-\|x\|^2} e^{2\mathrm{Re}\{x'^* xe^{j\theta}\}}$$

According to this approach, this expression is typically evaluated by way of various estimations of the probability function $p(x'|\theta)$, primarily due to computational complexity. Furthermore, determination of the maximum of the probability function $p(x'|\theta)$ is conventionally made by estimating the derivative f the probability function $p(x'|\theta)$, with the understanding that the derivative of a function is zero at a maximum. One example of such an estimate of the probability function $p(x'|\theta)$, as used in conventional decision directed phase estimation processes carried out by phase detector 6 in carrier recovery circuit 2 of FIG. 1, utilizes a Taylor series expansion of the probability function. This and other conventional estimates are suitable for non-amplitude modulated signals, such as QPSK modulation. However, these estimates generally introduce significant error into QAM signals, particularly in cases where the number N of constellation values becomes large, such as 64 or 256.

A well-known measure of the effectiveness of carrier recovery is the so-called S curve. The S curve plots the phase correction signal output of the phase detector circuit (e.g., phase detector 6 of FIG. 1) as a function of phase error. Typically, because the curve passes through the origin of the plot (zero phase error resulting in a null correction signal), and increases in magnitude with increasing phase error (and of the same polarity as the error), this plot is ideally sinusoidal for realistic circuitry, hence the name S-curve. For typical examples of carrier recovery circuits such as those illustrated in FIG. 1, particularly in the case where estimations are made of the probability function, as described above, the S-curves are far from ideal. FIG. 2 is an example of an S-curve for a conventional decision-directed carrier recovery circuit such as shown in FIG. 1 and described above, for a 64 QAM modulation scheme. As evident from FIG. 2, the phase correction signal is quite well-behaved at very small phase errors, but rapidly drops off at somewhat larger phase errors. In addition, false zero points FZ are present in the S curve, indicating that certain non-zero phase errors may also produce a null correction signal, locking phase error into the recovered signal.

BRIEF SUMMARY OF THE INVENTION

It is therefore an object of the present invention to provide a carrier recovery circuit and method that provides highly accurate phase detection for amplitude and phase modulated signals.

It is a further object of the present invention to provide such a circuit and method that may be readily implemented by way of modern digital signal processor technology.

It is a further object of the present invention to provide such a circuit and method in which an extract form of the probability function derivative is used in phase detection.

It is a further object of the present invention to provide such a circuit and method that is useful for high bandwidth applications such as cable modems.

Other objects and advantages of the present invention will be apparent to those or ordinary skill in the art having reference to the following specification together with its drawings.

The present invention may be implemented into a carrier recovery circuit in which phase detection is carried out by way of generation of a derivative of a probability function. According to the present invention, the evaluation of this derivative is performed by summing a complex operator over at least a portion of the possible points in the modulation constellation. The resulting derivative signal corresponds to the phase error then detected by the phase detector and, after filtering and integration, is applied as a phase correction to the input signal. Evaluation of the derivative signal preferably utilizes an increased estimate of random noise power, for stability in the correction S curve. The derivative probability function may also be evaluated by summing only small magnitude constellation points, for computational efficiency. According to another alternative implementation of the present invention, a Taylor series estimate is used in connection with QAM or other amplitude-modulated signals.

BRIEF DESCRIPTION OF THE SEVERAL VIEWS OF THE DRAWING

FIG. 4 is an electrical diagram, in block form, of a carrier recovery circuit in the cable modem of FIG. 3, and constructed according to the preferred embodiment of the invention.

FIG. 5 is an electrical diagram, in block form, illustrating the operations of a phase detector in the carrier recovery circuit of FIG. 4, according to a first preferred embodiment of the invention.

FIG. 6 is a flow diagram illustrating the operation of the carrier recovery circuit of FIG. 4, according to the first preferred embodiment of the invention.

DETAILED DESCRIPTION OF THE INVENTION

Figure 1:
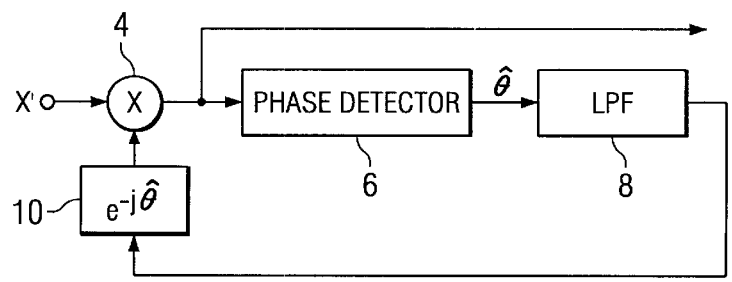
FIG. 1 is a electrical diagram, in block form, of a carrier recovery circuit according to the prior art.
Figure 2:
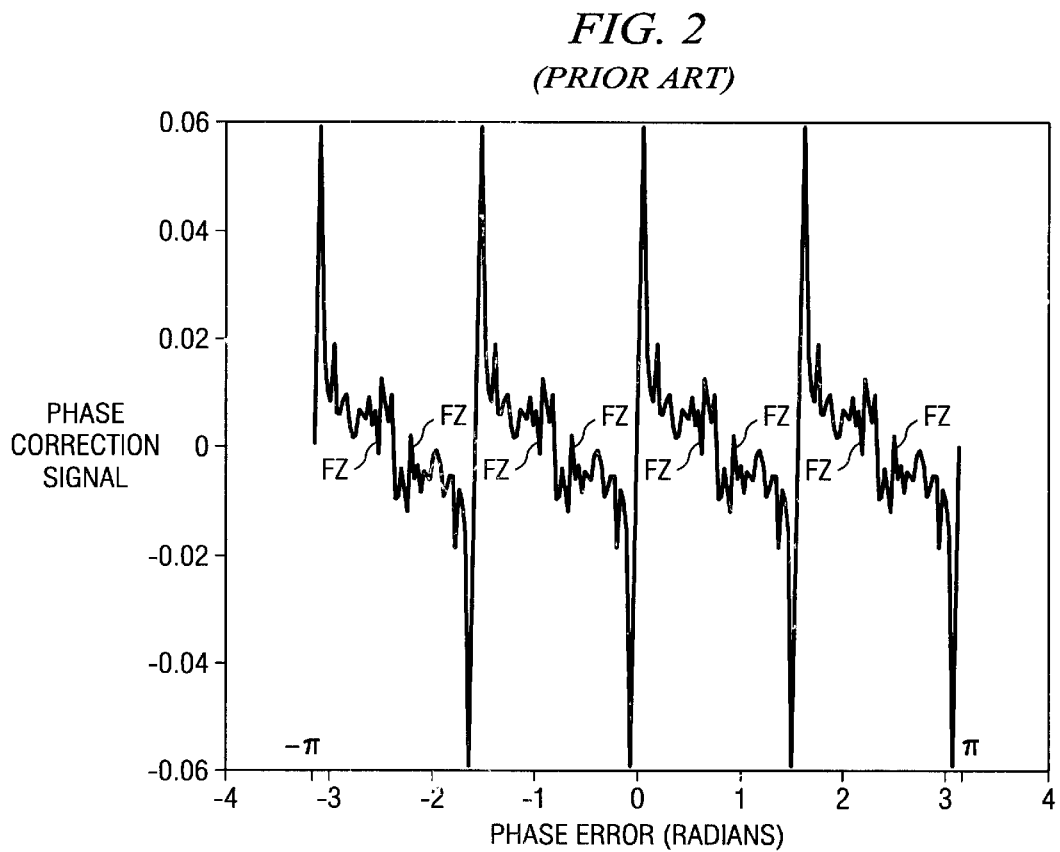
FIG. 2 is a plot of phase correction signal versus phase error for an exemplary implementation of a conventional carrier recovery circuit.
Figure 3:
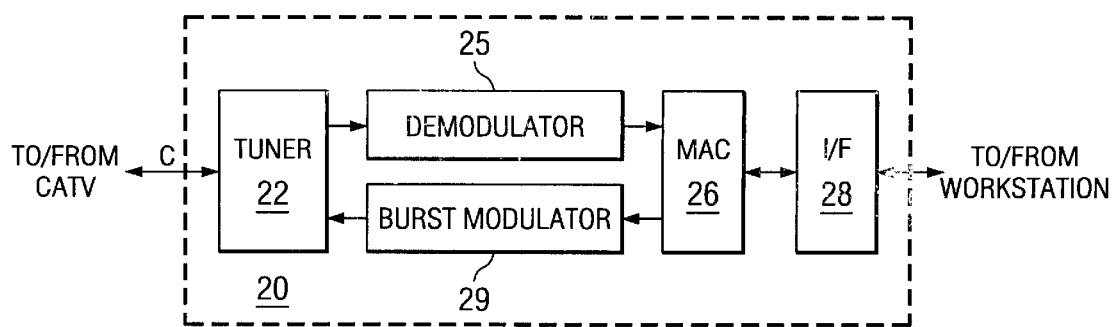
FIG. 3 is an electrical diagram, in block form, of a cable modem constructed according to the preferred embodiment of the invention.

Referring now to FIG. 3, the construction and operation of the preferred embodiments of the present invention will now be described relative to cable modem 20. It is to be understood that the present invention may be useful and beneficial in the demodulation and carrier recovery of phase-modulated signals in various applications other than cable modems, for example in digital subscriber line modems (xDSL modems), wireless communications, and other data communication systems. Accordingly, the preferred embodiments of the present invention will be described in connection with cable modem 20, as it is contemplated that those skilled in the art, having reference to this specification, will be readily able to implement the present invention in such alternative applications.

As illustrated in FIG. 3, cable modem 20 provides communication between a workstation such as a personal computer (or, alternatively, a "dumb" terminal, Web-based television, and the like) and a cable service provider, over conventional coaxial cable C. As is becoming prevalent in the art, cable service providers include such entities as cable television companies and telephone and telecommunications carriers, such that cable C serves as a high bandwidth communications facility both for the communication of television and other video programming, and also for bidirectional data communications such as Internet access. Tuner 22 connects directly to cable C, to effect bidirectional communications over cable C at the desired frequencies. The data communications transmitted and received by cable modem 20 are contemplated to be of high data rates, and as such will typically be carried out by way of phase-modulated signals. The modulation of the signals may also include amplitude modulation in combination with phase-modulation, such as is present in digitally modulated quadrature amplitude modulation (QAM); alternatively, for some of the examples described herein, the modulation of these signals may be confined to phase-modulation, such as in the case of quadrature phase-shift keying (QPSK). As is known in the art, and as discussed above, the phase modulation utilized in conventional QAM, QPSK, and other modulation schemes is a differential phase modulation, where the encoding of each symbol corresponds (at least in part) to a relatively phase shift of the symbol relative to the preceding symbol. As a result, an absolute phase standard is not required in cable modem 20.

On the transmit side of cable modem 20 (referring to transmission of data from the workstation to cable C), interface 28 receives digital data from the workstation, according to a particular protocol (e.g., PCI, USB, EtherNet), and communicates this data to media access controller (MAC) 26. MAC 26 controls the overall operation of cable modem 20 for both the transmission and receipt of data, according to the various protocols that are implemented. Data transmitted from the workstation is applied by MAC 26 to burst modulator 29, which performs the appropriate encoding and modulation of the digital data to the desired format. For example, burst modulator 29 may execute Reed-Solomon encoding for purposes of error correction and detection, and will also modulate the encoded data according to the desired protocol (e.g., QAM, QPSK). burst modulator 29 may also include a digital-to-analog conversion (DAC) capability, so that its output signal to tuner 22 is a modulated analog signal, of a gain selected to compensate for cable losses. Tuner 22 then applies this modulated signal to cable C according to the particular implementation.

The present invention is particularly directed to the receive side of cable modem 20, within which modulated signals received from the cable services provider on cable C are demodulated into digital data for use by the workstation. On the receive side, tuner 22 forwards incoming modulated signal to demodulator 25. As will be described in some further detail below, demodulator 25 converts the modulated analog signal into digital form, removes the carrier signal to recover the data portion of the signal, and executes the desired error correction and synchronization of the demodulated signal as required. The output of demodulator 25 is forwarded to MAC 26, which applies the appropriate protocol overhead and framing to the received demodulated signal, and forwards the same to the workstation via interface 28.

Referring now to FIG. 4, the general construction of demodulator 25 according to the preferred embodiment of the invention will now be described. The particular architecture of demodulator 25 may vary among applications, and depending upon the particular protocol and realization that is desired. It is contemplated that those skilled in the art, having reference to this specification, will be readily able to implement the present invention within such alternative architectures.

Demodulator 25 includes analog "front end" (AFE) 30, which receives modulated analog signals from tuner 22. AFE 30 is generally implemented by way of one or more integrated circuits suitable for performing such functions as coarse gain setting, and analog-to-digital conversion (ADC). According to this particular example of demodulator 25, and considering that the modulated signals received by tuner 22 are phase-modulated (and may also be amplitude-modulated), AFE 30 also preferably separates the received digitized signal into in-phase and quadrature components, communicated by way of simultaneous digital words on lines I, Q, respectively, which are then received by digital down-mixer 32. Digital down-mixer 32 is conventional circuitry for effecting a first stage of demodulation, translating the spectral center of the digitized in-phase and quadrature signals down to pure DC, thus leaving only the signal portion of the modulated signal in combination with any noise and residual error therein. The down-mixed in-phase and quadrature digital signals are then filtered by decimator/filters 33I, 33Q, respectively, to further shape the signals; for example, a square-root raised cosine filter may be implemented into decimator/filters 33I, 33Q. The filtered de-mixed digitized in-phase and quadrature samples are then presented to equalizer function 34, which removes intersymbol interference (ISI) therefrom; equalizer function 34 then presents the in-phase and quadrature digital symbol values on lines I, Q, respectively, to carrier recovery circuit 35.

Carrier recovery circuit 35 will be described in further detail hereinbelow. In general, carrier recover circuit 35 effectively removes any carrier phase (and, accordingly, frequency) offset, so as to ideally provide an output corresponding to a series of points within the particular constellation of QAM or QPSK values according to which the incoming signal was modulated. As described above, QAM includes both phase and amplitude modulation in its constellation, such that each sample value corresponds to one of a determined set of phase and amplitude combinations. QPSK, on the other hand, is phase-modulated only, such that each available combination in the QPSK constellation is determined by relative phase only. The recovered signal from carrier recovery circuit 35 is applied to error-correct function 36. Error-correct function 36 is conventional circuitry for performing such functions as unique word detection circuitry to delineate packets or cells in the transmitted stream, and Reed-Solomon decoding for error detection and error correction. The resulting signals from the output of error-correct function 36 are forwarded to MAC 26 via interface 38; interface 38 may include FIFO buffers and the like so that input/output data rate decoupling is effected.

Referring now to FIG. 5, carrier recovery circuit 35 according to the preferred embodiment of the invention will now be described. FIG. 5 illustrates the construction of carrier recovery circuit 35 as an interconnection of function blocks, as will be described below. It is contemplated, however, that carrier recovery circuit 35 is best implemented by way of a high-performance digital signal processor (DSP), such as by one of the TMS320c6x class of DSPs available from Texas Instruments Incorporated, assignee of the present application. As will be further noted below, it is contemplated that those skilled in the art will be readily able to implement the functions and operations of carrier recovery circuit 35 by coding of programs for such programmable high-performance processing circuitry. In order to clearly describe the functions to be so provided by carrier recovery circuit 35, however, FIG. 5 illustrates these functions as separate circuit function blocks.

As illustrated in FIG. 5, input signal x' is received by multiplier 39, in the form of an in-phase component x+I and a quadrature component x'Q. As discussed above relative to FIG. 4, input signal x' is a down-mixed signal having a central frequency at about DC, and which includes phase error θ and random noise n as follows:

$$x'xe^{j\theta}+n$$

where the complex value x refers to the value of the actual signal (i.e., one of the points in the QAM or QPSK constellation). A second input of multiplier 39 receives a phase correction $e^{-j\hat{\theta}}$ from phase correction function 46, where $\hat{\theta}$ is a phase correction angle that is intended to approximate the phase error θ in input signal x' as noted above. According to this embodiment of the invention, the output of multiplier 39 is forwarded to error-correct function 36 in demodulator 25 in FIG. 4, and also to phase detection function 40. Phase detection function 40 generates a derivative signal g(x") based upon the actual phase error θ in input signal x' and also the current estimate of phase error correction signal $\hat{\theta}$, in the manner described hereinbelow. Derivative signal g(x") is applied to low pass filter 42, and integrated by summation function 44, to update phase correction signal $\hat{\theta}$ that is applied to phase correction function 46, which in turn generates phase correction $e^{-j\hat{\theta}}$.

According to the preferred embodiment of the invention, as noted above, carrier recovery circuit 35 is implemented by way of a digital signal processor. In such a realization, each of the signal lines illustrated in FIG. 5 represents a digital word or words, and each of the functional blocks illustrated in FIG. 5 corresponds to a digital operation. Of course, it is contemplated that these functions of carrier recovery circuit 35 may alternatively be implemented by way of analog functions, or mixed signal functions (i.e., some digital and some analog, with analog-to-digital and digital-to-analog conversion performed as appropriate), so long as the desired precision is maintained. For purposes of modern cable modem implementations, however, it is contemplated that a full digital realization of carrier recovery circuit 35 is preferred, both for the resulting precision of the result and also to achieve the desired data rate.

The theory of operation of phase detection function 40 according to the preferred embodiment of the invention will now be described in detail. Phase detection function 40 effectively generates an estimate ε of the difference of the actual phase error θ and the current phase correction $\hat{\theta}$ by maximizing a probability function of the input signal x'; the phase angle at which this probability function is maximized thus provides a faithful estimate ε of the actual error. As described above, one must consider that the actual input value x is not known a priori, and as such one must maximize a summation of the probability function over the entire constellation; an exact representation of the probability function p(x'|θ) is expressed as:

$$p(x' \mid \theta) = \tilde{K} \sum_{\text{all } x} \exp(-\|x\|^2)\exp(2\text{Re}\{x'^* xe^{j\theta}\})$$

where $\tilde{K}$ is a constant.

According to the preferred embodiment of the invention, estimates of this probability function p(x'|θ) are not utilized (as in conventional phase detection, such as in decision directed phase detection), but instead a derivative of this probability function is evaluated by phase detection circuit 40 to produce derivative signal g(x") as shown in FIG. 5. Filtering and integration of derivative signal g(x") by low pass filter 42 and summation function 44 in turn produces the phase correction signal $\hat{\theta}$. In this regard, consider the following derivative of probability function p(x'|θ), where $v_n^2$ corresponds to the noise power of input signal x':

$$\frac{d}{d\theta}p(x'\mid\theta) =$$

$$\frac{\tilde{K}}{N}e^{-\frac{\|x'\|^2}{\sigma_n^2}}\sum_x \exp\left(-\frac{\|x\|^2}{\sigma_n^2}\right)\exp\left(2\frac{\mathrm{Re}\{x'^*xe^{j\theta}\}}{\sigma_n^2}\right)\frac{d}{d\theta}\left[\frac{2}{\sigma_n^2}\mathrm{Re}\{x'^*xe^{j\theta}\}\right]$$

Considering that:

$$Re\{(a+jb)(\cos\theta+j\sin\theta)\}=a\cos\theta-b\sin\theta$$

and that:

$$\frac{d}{d\theta}\mathrm{Re}\{(a+jb)(\cos\theta+j\sin\theta)\} = -a\sin\theta - b\cos\theta = -\mathrm{Im}\{(a+jb)e^{j\theta}\}$$

one can readily express the above expression of the derivative of probability function p(x'|θ) as follows:

$$\frac{d}{d\theta}p(x'\mid\theta) =$$

$$\frac{\tilde{K}}{N}\exp\left(-\frac{\|x'\|^2}{\sigma_n^2}\right)\sum_x\left[\exp\left(-\frac{\|x\|^2}{\sigma_n^2}\right)\exp\left(2\frac{\mathrm{Re}\{x'^*xe^{j\theta}\}}{\sigma_n^2}\right)\mathrm{Im}\{x'^*xe^{j\theta}\}\right]$$

$$\frac{d}{d\theta}p(x'\mid\theta) =$$

$$\frac{\tilde{K}}{N}\exp\left(-\frac{\|x'\|^2}{\sigma_n^2}\right)\sum_x\left[\exp\left(-\frac{\|x\|^2}{\sigma_n^2}\right)\exp\left(2\frac{\mathrm{Re}\{x'^*xe^{j\theta}\}}{\sigma_n^2}\right)\mathrm{Im}\{x''^*xe^{j\theta}\}\right]$$

Referring to FIG. 5, the output of multiplier 39 that is applied to phase detection function 40 (and to error-correction and equalize function 36) may be considered as a signal x" as follows:

$$x''=x'e^{-j\hat{\theta}}=(xe^{j\theta}+n)e^{-j\hat{\theta}}$$

where phase correction $e^{-j\hat{\theta}}$ is generated based upon phase error estimate $\hat{\theta}$. In terms of output signal x", and considering that:

$$x'^*e^{j\theta}=(x''e^{-j\theta})^*$$

phase detection function 40 according to the preferred embodiment of the invention can evaluate the derivative signal g(x") as follows:

$$g(x'') = \frac{d}{d\theta}p(x'\mid\theta)\bigg|_{\hat{\theta}} = \sum_x\left[\exp\left(-\frac{\|x\|^2}{\sigma_n^2}\right)\exp\left(2\frac{\mathrm{Re}\{x''^*x\}}{\sigma_n^2}\right)\mathrm{Im}\{x''^*x\}\right]$$

The summation over x refers to summation over each of the constellation points for the particular modulation mode. For the example of 256 QAM, the summation would be carried out, for each instance of signal x" received by phase detection function 40, over each of the 256 amplitude-phase combinations in the QAM constellation. For the example of 64 QPSK, the summation would be carried out each of the 64 phase angles in the QPSK constellation (amplitude being constant).

As evident from the foregoing, derivative signal g(x") is produced directly from the input x" to phase detection function 40 and the modulation constellation, and in an exact form (i.e., not requiring estimates, recursive operations, or the like). Derivative signal g(x") generated by phase detection function 40 according to the preferred embodiment of the invention provides important features. Firstly, the exact representation of derivative signal g(x") makes no assumptions regarding the amplitude of the input signal x', and as such is suitable for phase-modulated signals generally, including amplitude and phase modulated signals (e.g., QAM) and constant-amplitude phase-modulated signals (e.g., QPSK). Secondly, the S curve behavior of derivative signal g(x") has been observed to be well-behaved, as will be described below. In this regard, it has been found that it is useful to increase the noise power factor $\sigma_n^2$ from its actual level to a higher level, for purposes of stability.

The general operation of carrier recovery circuit 35 according to the preferred embodiment of the invention will now be described relative to the flow diagram of FIG. 6, with reference to FIGS. 4 and 5. This operation begins with process 48, in which carrier recovery circuit 35 receives digital in-phase and quadrature component values x'I, x'Q, respectively, that have been digitally down-mixed by down-mixer 32 (FIG. 4) to have a center frequency at or near DC. These in-phase and quadrature component values x'I, x'Q are multiplied, in process 50, with the current phase correction $e^{-j\hat{\theta}}$. This operation is illustrated, in FIG. 5, by multiplier function 39 which receives phase correction $e^{-j\hat{\theta}}$ from phase generation function 46. In practice, process 50 may be readily carried out in a digital signal processor by way of a conventional complex multiplication instruction, using phase correction $e^{-j\hat{\theta}}$ represented by in-phase and quadrature components stored in a register or other store therewithin.

The result of process 50 corresponds to complex output signal x" which is forwarded to error-correction function 36 (FIG. 4). Additionally, this complex output signal x" (i.e., having in-phase and quadrature components) is used in process 52 to derive derivative signal g(x"). Process 52 is performed by carrier recovery circuit 35, for example by way of execution of a program of instructions by a digital signal processor (such program corresponding to phase detection function 40 of FIG. 5), to generate a digital signal value (or vales, in the complex form), based upon the derivative function:

$$g(x'') = \frac{d}{d\theta}p(x'\mid\theta) = \sum_x\left[\exp\left(-\frac{\|x\|^2}{\sigma_{nA}^2}\right)\exp\left(2\frac{\mathrm{Re}\{x''^*x\}}{\sigma_{nA}^2}\right)\mathrm{Im}\{x''^*x\}\right]$$

As illustrated in FIG. 6, process 51 provides, to process 52, an amplified noise power value $\sigma_{nA}^2$ that is larger than the actual noise power in input signal x', to provide improved stability in the S-curve response of carrier recovery circuit 35. Considering both signal x" and each constellation point x as paired values of digital in-phase and quadrature values (i.e., real and imaginary component values), it is contemplated that those skilled in the art will be readily able to generate the necessary program instructions suitable for performing the above summation. Indeed, it is contemplated that, with modern high-performance digital signal processing capability (such as may be provided by the TMS320c6x DSPs mentioned above) in carrier recovery circuit 35, process 52 may be carried out quite rapidly, in real-time relative to the receipt of the modulated input signals on cable C (FIG. 3).

Referring back to FIG. 6, the output of process 52 is then filtered in process 54, preferably by way of a suitable digital low-pass filter, to generate a resulting phase correction signal $\hat{\theta}$. Phase correction signal $\hat{\theta}$ may simply be represented as an angle in radians at this point, for example as a value between $+\pi$ and $-\pi$, and thus representative of a correction factor to be applied to the input signal x'. Process 56 is then performed to generate a complex phase correction $e^{-j\hat{\theta}}$ in process 56. Filter and generation processes 54, 56 correspond to filter function 42, summation function 44, and phase correction generation function 46 in the functional diagram of FIG. 5. The resulting phase correction $e^{-j\hat{\theta}}$ is preferably represented by a complex number of unit magnitude (i.e., a pair of values corresponding to real and imaginary components), which can be readily applied to the next value of the input signal x'; as such, control then passes to process 48 in the flow of FIG. 6, repeating the process.

Figure 7:
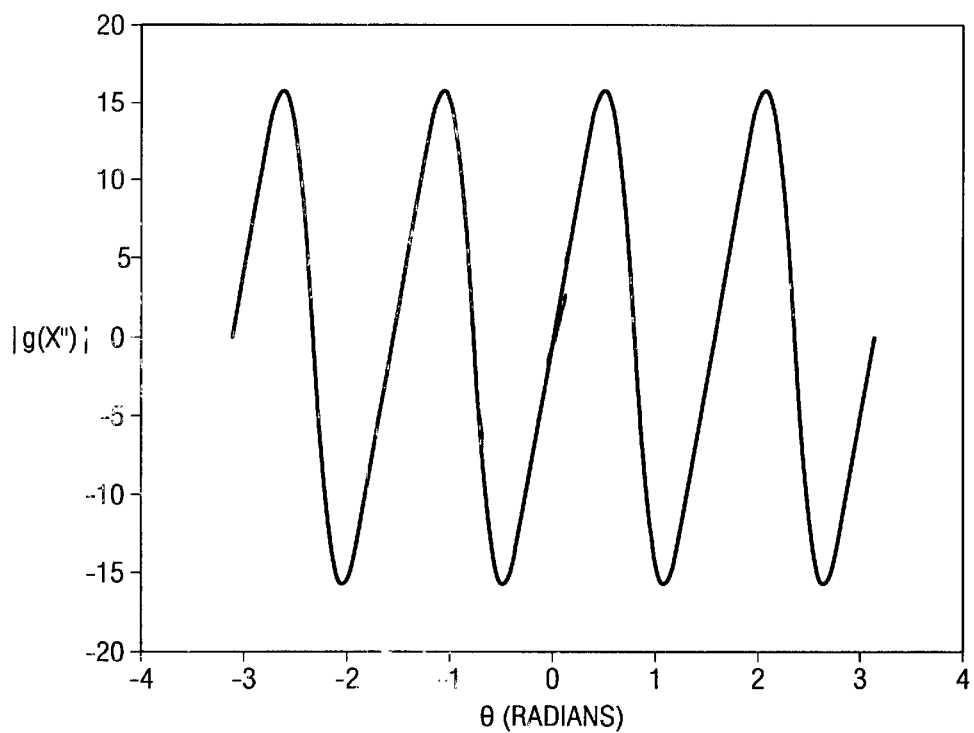
FIG. 7 is an S-curve plot of phase correction signal versus phase error for an exemplary implementation of the carrier recovery circuit of FIG. 5 operating according to the processes of FIG. 6 and according to the first preferred embodiment of the invention.

FIG. 7 provides an example of the S-curve that is contemplated for a particular realization of the preferred embodiment of the invention. In the example of FIG. 7, the performance of the method described hereinabove relative to FIG. 6 is illustrated for the case of 256 QAM signals. In this example, amplified noise power $\sigma_{nA}^2$ is set to a value of at least ten, for a 12 dB SNR in the input signal. As illustrated by FIG. 7, the S-curves are quite well-behaved, with no false zeros.

Referring back to FIGS. 3 and 4, the output signal x" from carrier recovery circuit 35 is applied to error-correct function 36, for detection of packet and cell boundaries and overhead, and for Reed-Solomon decoding for error detection and error correction. The output of error-correct function 36 is then forwarded to MAC 26 via interface 38. As noted above, MAC 26 then which forwards the received demodulated signal, after applying the appropriate protocol overhead and framing, to the workstation via interface 28. The workstation is then able to process the communications in the desired manner.

As described above, according to the preferred embodiment of the invention, the generation of the derivative signal g(x") occurs in an exact form, thus providing important benefits in the derotation or carrier recovery of phase-modulated signals. Because no assumptions are made regarding the amplitude of the input signal x', the preferred embodiment of the present invention may be applied to amplitude and phase modulated signals (e.g., QAM) or to constant-amplitude phase-modulated signals (e.g., QPSK). Secondly, the S curve behavior of derivative signal g(x") has been observed to be well-behaved, as will be described below. In this regard, it has been found that it is useful to increase the noise power factor $\sigma_n^2$ from its actual level to a higher level, for purposes of stability.

According to an alternative embodiment of the present invention it has been observed that the derivative signal g(x") as derived above relative to the example of FIG. 6 is heavily weighted by those constellation points of lower magnitude. Referring against to the foregoing derivation:

$$g(x'') = \frac{d}{d\theta} p(x'|\theta) = \sum_x \left[ \exp\left(-\frac{\|x\|^2}{\sigma_{nA}^2}\right) \exp\left(2\frac{\text{Re}\{x'''^*x\}}{\sigma_{nA}^2}\right) \text{Im}\{x'''^*x\} \right]$$

the $$\exp\left(-\frac{\|x\|^2}{\sigma_{nA}^2}\right)$$

term falls off exponentially with the square of the magnitude of x. As such, it has been discovered, according to a second embodiment of the invention, that for even for relatively simple QAM constellations (sixteen point an up), significant computational efficiency may be obtained by simply summing over the small magnitude members of the constellation. Of course, since points in QPSK constellation are of the same magnitude (i.e., no amplitude modulation is included), this simplification is not particularly beneficial.

Referring now to FIG. 8, again with reference to FIGS. 4 and 5, a method of performing carrier recovery for QAM signals by way of a second preferred embodiment of the present invention will now be described. Like processes are referred to in FIG. 8 by the same reference numerals as used above in FIG. 6; as these processes are substantially identical with those of FIG. 6, no additional description will be provided therefor relative to FIG. 8.

Following the receipt of the in-phase and quadrature input signal x' components in process 48, and the application of the current phase correction $e^{-j\hat{\theta}}$ in process 50, carrier recovery circuit 35 according to this alternative embodiment of the invention next performs process 52', by way of which only small magnitude points in the QAM constellation are incorporated into the sum. The amplified noise power level from process 51 is also preferably used in process 52', for stability as described above.

In this regard, one may consider only the four small magnitude points in the constellation represented by:

$$x = \pm 1 \pm j$$

in the summation operation by way of which derivative signal g(x") is evaluated. This reduces the summation to the following:

$$g(x'') = \exp\left(-\frac{2}{\sigma_{nA}^2}\right)\Bigg(\exp\left(\frac{2}{\sigma_{nA}^2}(x_r'' + x_i'')\right)(x_r'' + x_i'') +$$

$$\exp\left(\frac{2}{\sigma_{nA}^2}(x_r'' - x_i'')\right)(-x_r'' - x_i'') +$$

$$\exp\left(\frac{2}{\sigma_{nA}^2}(-x_r'' + x_i'')\right)(x_r'' + x_i'') +$$

$$\exp\left(\frac{2}{\sigma_{nA}^2}(-x_r'' - x_i'')\right)(-x_r'' + x_i'')\Bigg)$$

In this example, $x''_r$ and $x''_i$ correspond to the real and imaginary (in-phase and quadrature) components of input signal x" after phase correction of process 50. By way of simple complex arithmetic, this expression readily reduces to:

$$g(x'') = \exp\left(-\frac{2}{\sigma_{nA}^2}\right)\Bigg(\bigg[\exp\left(\frac{2}{\sigma_{nA}^2}(x_r'' + x_i'')\right) -$$

$$\exp\left(-\frac{2}{\sigma_{nA}^2}(x_r'' - x_i'')\right)\bigg](x_r'' + x_i'') -$$

$$\bigg[\exp\left(\frac{2}{\sigma_{nA}^2}(x_r'' + x_i'')\right) - \exp\left(-\frac{2}{\sigma_{nA}^2}(x_r'' + x_i'')\right)\bigg](x_r'' + x_i'')\Bigg)$$

which in turn reduces to:

$$g(x'') = 2e^{-\frac{2}{\sigma_{nA}^2}}\left[\cosh\left(\frac{2}{\sigma_{nA}^2}(x_r'' + x_i'')\right)(x_r'' - x_i'') - \sinh\left(\frac{2}{\sigma_{nA}^2}(x_r'' - x_i'')\right)(x_r'' - x_i'')\right]$$

and thus to:

$$g(x'') = 4e^{-\frac{2}{\sigma_{nA}^2}}\left[\cosh\left(\frac{2}{\sigma_{nA}^2}(x_r'')\right)\sinh\left(\frac{2}{\sigma_{nA}^2}(x_i'')\right)x_r'' - \sinh\left(\frac{2}{\sigma_{nA}^2}(x_r'')\right)\cosh\left(\frac{2}{\sigma_{nA}^2}(x_i'')\right)x_i''\right]$$

According to this second preferred embodiment of the present invention, process 52' evaluates this representation of g(x"), for example by way of execution of a program of instructions by a digital signal processor, such a program being readily codable by those skilled in the art having reference to this specification. Alternatively, or in conjunction with such a program, a look-up table in memory may be used in evaluation of the hyperbolic functions cosh and sihn. In any case, it is contemplated that the evaluation performed in process 52' according to this second preferred embodiment of the invention will generally be more rapidly performed than the summation performed in generating the derivative signal g(x") over the entire constellation, as described above relative to FIG. 6.

Figure 8:
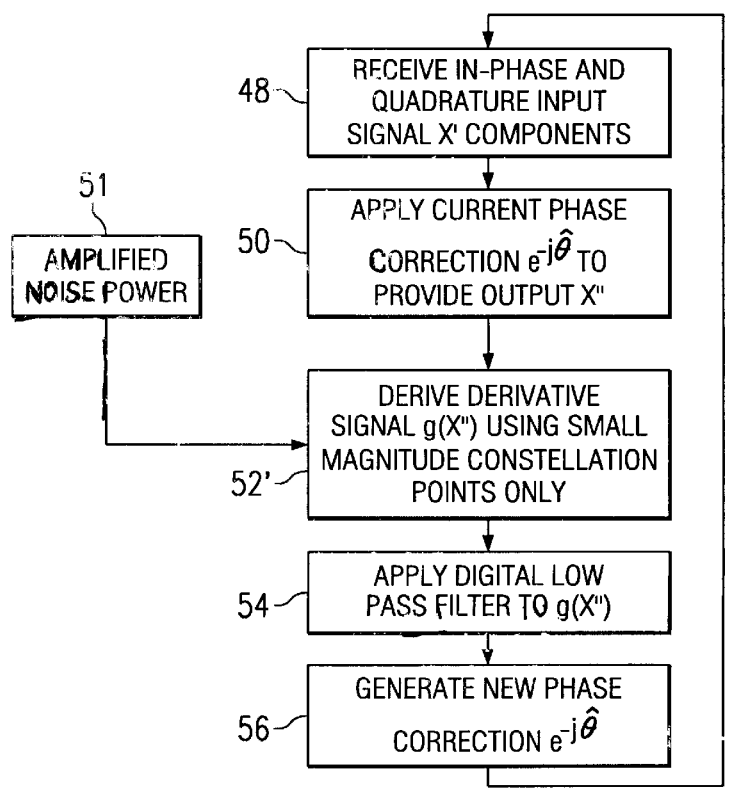
FIG. 8 is a flow diagram illustrating the operation of the carrier recovery circuit of FIG. 4, according to a second preferred embodiment of the invention.

As illustrated in FIG. 8, once the derivative signal g(x") has been evaluated in process 52', the remainder of the carrier recovery operation proceeds in the manner described above, with the derivative signal g(x") filtered in process 54, and used in the generation of a new phase correction signal $e^{-j\theta}$ in process 56.

Figure 9:
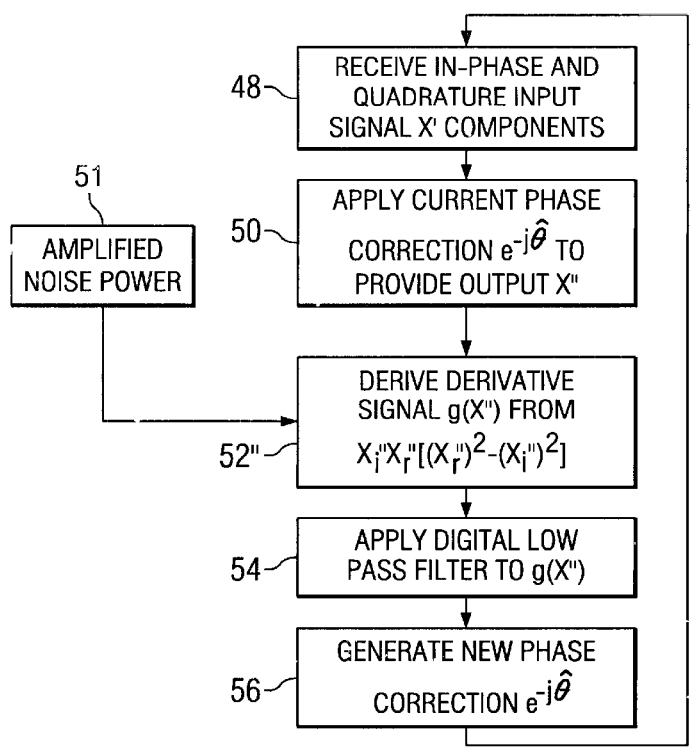
FIG. 9 is a flow diagram illustrating the operation of the carrier recovery circuit of FIG. 4, according to a third preferred embodiment of the invention.

Referring now to FIG. 9 in combination with FIGS. 4 and 5, a method of performing carrier recovery for QAM signals by way of a third preferred embodiment of the present invention will now be described; this third preferred embodiment of the invention provides still further processing efficiency for the case of QAM signals. Again, like processes are referred to in FIG. 8 by the same reference numerals as used above in FIGS. 6 and 8, as these processes are substantially identical therewith.

According to this preferred embodiment of the invention, derivative signal g(x") is evaluated by carrier recovery circuit 35 in alternative process 52", in a manner that further simplifies the expression used in process 52' of FIG. 8. As noted above, the derivative signal g(x") in process 52' is evaluated as:

$$g(x'') = 4e^{-\frac{2}{\sigma_{nA}^2}}\left[\cosh\left(\frac{2}{\sigma_{nA}^2}(x_r'')\right)\sinh\left(\frac{2}{\sigma_{nA}^2}(x_i'')\right)x_r'' - \sinh\left(\frac{2}{\sigma_{nA}^2}(x_r'')\right)\cosh\left(\frac{2}{\sigma_{nA}^2}(x_i'')\right)x_i''\right]$$

However, one may further simplify this expression by the assumption that the signal-to-noise margin is neither extremely small nor extremely large, such that the following Taylor series approximations of the hyperbolic functions are reasonable:

$$\sinh(x) = x$$

$$\cosh(x) = 1 + x^2/2$$

Substituting these approximations into the foregoing expression of g(x"), and ignoring constant terms, provide the following:

$$g(x'') = \left[\left(1 + \frac{2}{\sigma_{nA}^4}(x_r''^2)\right)\frac{2}{\sigma_{nA}^2}x_i''x_r'' - \frac{2}{\sigma_{nA}^3}x_r''x_i''\left(1 + \frac{2}{\sigma_{nA}^4}x_r''^2\right)\right]$$

This reduces to:

$$g(x'') = \frac{2}{\sigma_{nA}^2}x_i''x_r''\left[\frac{4}{\sigma_{nA}^4}(x_r''^2 - x_i''^2)\right]$$

and then to:

$$g(x'') = \frac{8}{\sigma_{nA}^6}x_i''x_r''[x_r''^2 - x_i''^2]$$

and, through ignoring of constant terms, to:

$$g(x'') = x_i''x_r''[x_r''^2 - x_i''^2]$$

This final expression for the derivative signal g(x") corresponds to the Taylor series estimates made for QPSK and other PSK signals, in which amplitude modulation is not included. However, according to the preferred embodiment of the invention, as described above relative to the derivation of the derivative expression signal for process 52", it has been found that this Taylor series estimate is also valid for QAM and other phase and amplitude modulated signals. It is believed that, without this derivation, use of the Taylor series estimate for amplitude-modulated signals, such as QAM, was not valid and hence such an approach has not yet been previously used in the art. As is especially evident from the foregoing, however, the complexity of calculations required in process 52" is relatively low, enabling carrier recovery circuit 35 to be used for demodulation of QAM signals even if processing power is not readily available. It is clearly believed to be within the skill of those in the art to write the appropriate computer program to perform process 52", either by way of direct calculation or by way of look-up tables in memory.

As shown in FIG. 9, the generation of the derivative signal g(x") is followed by low-pass filtering process 54, and then the generation of a new phase correction signal $e^{-j\theta}$ in process 56, to update the phase correction applied by carrier recovery circuit 35.

Figure 10:
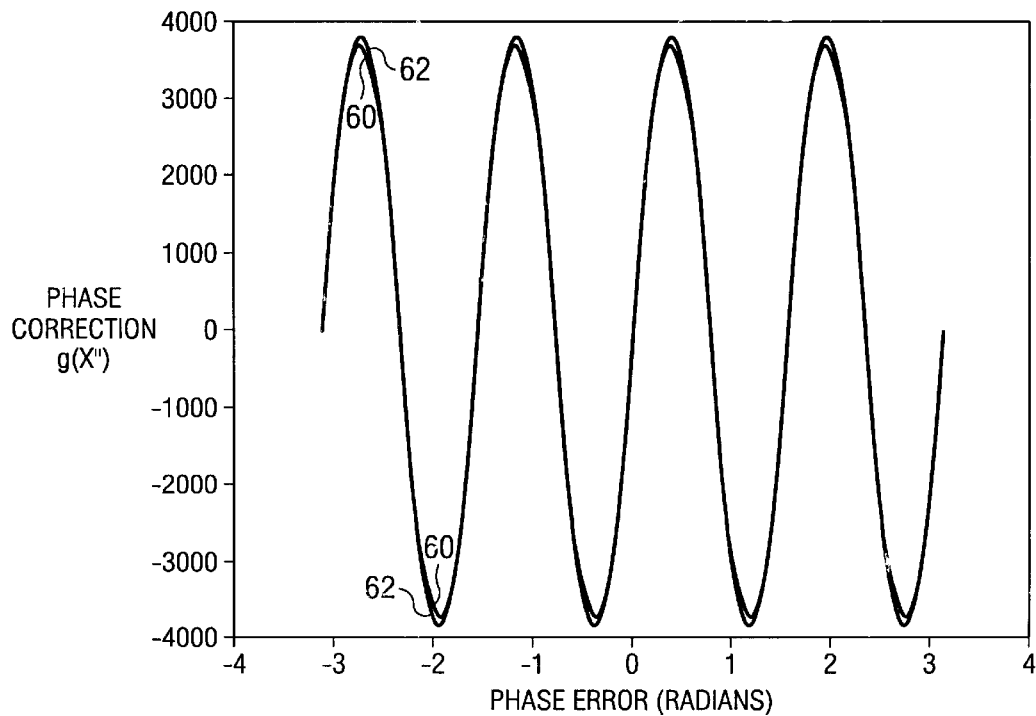
FIG. 10 illustrates S-curve plots of phase correction signal versus phase error for exemplary implementations of the carrier recovery circuit of FIG. 5 operating according to the processes of FIGS. 8 and 9, and thus according to second and third preferred embodiments of the invention, respectively.

Each of the alternative processes 52', 52" of FIGS. 8 and 9 have been observed to provide excellent S-curve behavior, as will now be discussed relative to FIG. 10. Curve 60 represents the behavior of the phase correction process 52' in which a four-point summation was performed for 256 QAM signals, while curve 62 represents the behavior of phase correction process 52" in which the Taylor series estimate was used, also upon 256 QAM signals; curves 60, 62 were normalized relative to one another, for comparison's sake. As evident from FIG. 10, each of processes 52' 52" provide well-behaved S-curve performance, with no false lock points, and are substantially equivalent to one another and to process 52 as illustrated in FIG. 7. Processes 52', 52" provide the further benefit of achieving such performance with further improved processing efficiency.

In each of the above-described embodiments of the invention, important benefits are obtained in carrier recovery of phase-modulated signals, including signals that are modulated both in phase and in amplitude. Excellent phase detection and phase error correction is obtained over the entire phase error range, due to the exactness of the evaluated expressions. Furthermore, the present invention is particularly well-suited for realization as program instructions executed by modern digital signal processors.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of performing carrier recovery from signals that are phase-modulated in such a manner that each symbol is encoded to correspond to one point of a plurality of points in an amplitude-phase constellation, the method comprising the steps of:
    down-mixing a phase-modulated signal to a central frequency near DC;
    applying a phase correction signal to a first symbol of the down-mixed signal to produce a corrected symbol;
    evaluating a derivative signal corresponding to phase error in the corrected symbol, by summing a complex function of the corrected symbol over at least a plurality of the points of the constellation;
    generating a new phase correction signal responsive to the derivative signal; and
    repeating the applying, evaluating, and generating steps for a plurality of symbols of the down-mixed phase-modulated signal;
    amplifying the noise power value to above a measure of random noise in the down-mixed signal, prior to the evaluating step; and
    wherein the complex function includes a noise power value.

2. The method of claim 1, wherein the evaluating step comprises summing the complex function of the symbol over all of the plurality of the points of the constellation.

3. The method of claim 2, wherein the phase-modulated signal is not amplitude-modulated.

4. The method of claim 2, wherein the phase-modulated signal is also amplitude-modulated.

5. The method of claim 2, wherein the complex function corresponds to:

$$\exp\left(-\frac{\|x\|^2}{\sigma_n^2}\right)\exp\left(2\frac{\text{Re}\{x'''^*x\}}{\sigma_n^2}\right)\text{Im}\{x'''^*x\}$$

wherein x'' corresponds to the corrected symbol, wherein x corresponds to one of the plurality of points of the constellation, and wherein $\sigma_n^2$ corresponds to a measure of noise power.

6. The method of claim 1, wherein the evaluating step comprises summing the complex function of the symbol over fewer than all of the plurality of the points of the constellation.

7. The method of claim 6, wherein the phase-modulated signal is also amplitude-modulated.

8. The method of claim 6, wherein the evaluating step sums the complex function over four small magnitude ones of the points of the constellation, the four points having quadrature phase relationships among one another.

9. A method of performing carrier recovery from signals that are phase and amplitude modulated in such a manner that each symbol is encoded to correspond to one point of a plurality of points in an amplitude-phase constellation, the method comprising the steps of:
    down-mixing a phase-modulated signal to a central frequency near DC;
    applying a phase correction signal to a first symbol of the down-mixed signal to produce a corrected symbol;
    generating a derivative signal corresponding to phase error in the corrected symbol, by evaluating, for the corrected symbol, the function:

$$s''_r x''_r [x''^2_r - x''^2_i]$$

wherein $x''_r$ and $x''_i$ correspond to the amplitude of in-phase and quadrature components of the corrected symbol;
    generating a new phase correction signal responsive to the derivative signal; and
    repeating the applying, evaluating, and generating steps for a plurality of symbols of the down-mixed phase-modulated signal.

10. The method of claim 9, wherein the phase and amplitude modulated signal corresponds to a quadrature amplitude modulation signal.

11. A modem, for decoding signals that are phase-modulated in such a manner that each symbol is encoded to correspond to one point of a plurality of points in an amplitude-phase constellation, comprising:
    a tuner for receiving the phase-modulated signals;
    a demodulator, comprising a carrier recovery circuit arranged to perform the functions of:
        a down-mixer, coupled to the tuner, for filtering the phase-modulated signal to a central frequency near DC;
        a carrier recovery circuit, coupled to the down-mixer and arranged to perform, for each symbol of the filtered phase-modulated signal, the operations of:
            applying a phase correction signal to the symbol to produce a corrected symbol;
            evaluating a derivative signal corresponding to phase error in the corrected symbol, by summing a complex function of the corrected symbol over at least a plurality of the points of the constellation; and
            generating a new phase correction signal responsive to the derivative signal;
    an interface, coupled to the demodulator, for communicating the corrected symbols to a workstation; and
    wherein the carrier recovery circuit comprises a programmable digital signal processor.

12. The modem of claim 11, wherein the complex function includes a noise power value that is set above a measure of random noise in the down-mixed signal.

13. The modem of claim 11, wherein the carrier recovery circuit performs the evaluating operation by summing the complex function of the symbol over all of the plurality of the points of the constellation.

14. The modem of claim 11, wherein the complex function corresponds to:

$$\exp\left(-\frac{\|x\|^2}{\sigma_n^2}\right)\exp\left(2\frac{\text{Re}\{x'''^*x\}}{\sigma_n^2}\right)\text{Im}\{x'''^*x\}$$

wherein x'' corresponds to the corrected symbol, wherein x corresponds to one of the plurality of points of the constellation, and wherein $\sigma_n^2$ corresponds to a noise power value.

15. The modem of claim 11, wherein the carrier recovery circuit performs the evaluating operation by summing the complex function of the symbol over fewer than all of the plurality of the points of the constellation.

16. The modem of claim 15, wherein the carrier recovery circuit performs the evaluating operation by summing over four small magnitude ones of the points of the constellation, the four points having quadrature phase relationships among one another.

17. The modem of claim 16, wherein the evaluating operation evaluates the function:

$$4e^{-\frac{2}{\sigma_n^2}}\left[\cosh\left(\frac{2}{\sigma_n^2}(x_r'')\right)\sinh\left(\frac{2}{\sigma_n^2}(x_i'')\right)x_r'' - \sinh\left(\frac{2}{\sigma_n^2}(x_r'')\right)\cosh\left(\frac{2}{\sigma_n^2}(x_i'')\right)x_i''\right]$$

wherein $x''_r$ and $x''_i$ correspond to the amplitude of in-phase and quadrature components of the corrected symbol, and wherein $\sigma_n^2$ corresponds to a noise power value.

18. A modem, for decoding signals that are phase and amplitude modulated in such a manner that each symbol is encoded to correspond to one point of a plurality of points in an amplitude-phase constellation, comprising:

a tuner for receiving the phase-modulated signals;

a demodulator, comprising a carrier recovery circuit arranged to perform the functions of:

a down-mixer, coupled to the tuner, for filtering the phase-modulated signal to a central frequency near DC;

a carrier recovery circuit, coupled to the down-mixer and arranged to perform, for each symbol of the filtered phase-modulated signal, the operations of:

applying a phase correction signal to the symbol to produce a corrected symbol;

generating a derivative signal corresponding to phase error in the corrected symbol, by evaluating, for the corrected symbol, the function:

$$x''_r x''_i [x''^2_r - x''^2_i]$$

wherein $x''_r$ and $x''_i$ correspond to the amplitude of in-phase and quadrature components of the corrected symbol; and generating a new phase correction signal responsive to the derivative signal; and an interface, coupled to the demodulator, for communicating the corrected symbols to a workstation.

19. The modem of claim 18, wherein the phase and amplitude modulated signal corresponds to a quadrature amplitude modulation signal.

* * * * *